Patented June 7, 1949

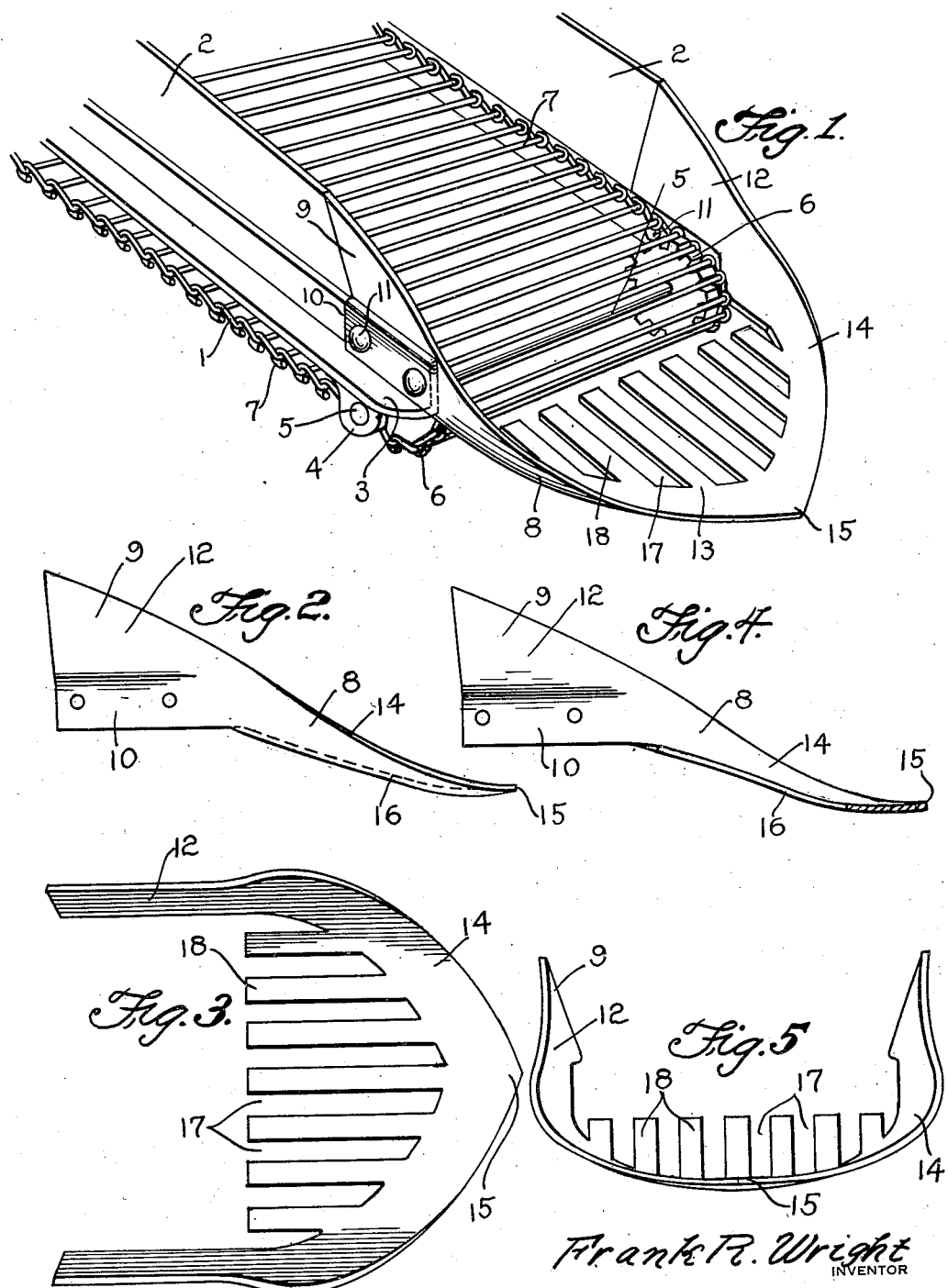

2,472,360

UNITED STATES PATENT OFFICE 2,472,360

POTATO DIGGER BLADE

Frank R. Wright, Nezperce, Idaho

Application July 26, 1945, Serial No. 607,185

3 Claims. (Cl. 55—137)

My present invention, in its broad aspect, has reference to improvements in blades for digging potatoes, and the like, and among its many advantages are: (1), the contour and form of the blade which increases the efficiency of the digging operation and decreases damage to the potatoes harvested, and assists in the removal of refuse, stones, dirt and the like, (2), the provision of improved means for attaching the blade to the digger conveyor, and (3), the improved form of side extension which prevents dislodgement of the harvested potatoes, and insures their smooth and uninterrupted travel to the conveyor.

Other and equally important objects and advantages of my invention will be apparent from the following description and drawings, and it is emphasized that changes in form, size, shape, materials and construction and arrangement of parts is permissible and within my broad inventive concept and the scope of the appended claims.

In the drawings, wherein I have illustrated a preferred form of my invention—

Figure 1 is a perspective view of the same applied to a potato digger and conveyor;

Figure 2 is a side view;

Figure 3 is a top plan view;

Figure 4 is a longitudinal section, and

Figure 5 is a front end view.

In the drawings, wherein like characters of reference are use to designate like or similar parts throughout the several views—

The numeral 1 designates the conveyor frame of a potato digger, which has side walls 2, side rails 3 with depending journal extension 4, and a conveyor shaft 5 on which are sprockets 6 for mounting the chain and bar conveyor 7. The conveyor permits dirt and the like to fall through the bars as the potatoes are carried along.

Attached to the side rails 3 is my blade 8 which has side extension 9, offset as at 10 to receive and be attached by bolts or rivets 11 to the side rails 3, and the upwardly extending and downwardly angled side flanges 12 of which contact with the side walls 2 and gradually slope or are curved into the body 13 of the blade. The body has curved sides 14 meeting at a point 15 and is swept downwardly and forwardly as at 16. The body is plurally slotted as at 17 to provide spaced, parallel supporting bars 18 which constitute the bottom of the blade and extend to the conveyor 7, as shown in Figure 1.

From the foregoing, it is believed that the operation and advantages of my invention will be apparent, but it is again emphasized that interpretation of the scope of my invention should only be conclusive when made in the light of the subjoined claims.

I claim:

1. A potato digger blade, comprising a body having longitudinal slots in the bottom part thereof leading back from a point adjacent the front edge thereof, the sides of the front edge being curved forwardly to an apical point and the body curved downwardly and forwardly, rearwardly and upwardly extending attaching and guard flanges or extensions on the body, and the side edges of the body gradually curved upwardly to meet the extensions or flanges.

2. A potato digger blade, comprising a body having longitudinal slots in the bottom part thereof leading back from a point adjacent the front edge thereof, the sides of the front edge being curved forwardly to an apical point and the body curved downwardly and forwardly, rearwardly and upwardly extending attaching and guard flanges or extensions on the body, and the side edges of the body gradually curved upwardly to meet the extensions or flanges, the rear extensions being offset, and the front edges being downwardly and forwardly curved to meet the curved side edges of the body of the blade.

3. In a blade for a potato digger having a conveyor, side walls and side rails supporting the conveyor, the combination of rearward upstanding angled extensions on the blade meeting and joining the side walls, offset portions on said extensions about and attached to the side rails of the conveyor, spaced parallel rods extending from a point adjacent the forward end of said blade to the conveyor to form a slotted bottom for the blade, and side edge portions on said blade curved upwardly from the slotted bottom and merging with the extensions.

FRANK R. WRIGHT.

REFERENCES CITED

The following references are of record in the file of this patent:

UNITED STATES PATENTS

| Number | Name | Date |
|---|---|---|
| 1,019,681 | McIlveene | Mar. 5, 1912 |

FOREIGN PATENTS

| Number | Country | Date |
|---|---|---|
| 31,886 | Germany | June 15, 1885 |
| 72,328 | Germany | Dec. 13, 1893 |